US008473132B2

(12) United States Patent
Ichikawa et al.

(10) Patent No.: US 8,473,132 B2
(45) Date of Patent: Jun. 25, 2013

(54) VEHICLE AND METHOD FOR CONTROLLING THE SAME

(75) Inventors: Shinji Ichikawa, Toyota (JP); Tetsuhiro Ishikawa, Miyoshi (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 219 days.

(21) Appl. No.: 12/996,462

(22) PCT Filed: Jun. 3, 2009

(86) PCT No.: PCT/JP2009/060125
§ 371 (c)(1),
(2), (4) Date: Dec. 6, 2010

(87) PCT Pub. No.: WO2009/150969
PCT Pub. Date: Dec. 17, 2009

(65) Prior Publication Data
US 2011/0077812 A1 Mar. 31, 2011

(30) Foreign Application Priority Data
Jun. 9, 2008 (JP) .................................. 2008-150661

(51) Int. Cl.
*B60L 11/18* (2006.01)
(52) U.S. Cl.
USPC .. 701/22; 180/65.25; 180/65.26; 180/65.275; 180/62.28; 180/65.285; 903/903
(58) Field of Classification Search
USPC ............. 701/22, 29; 180/65.1, 65.21, 65.245, 180/65.25, 65.26, 65.275, 65.28, 65.285, 180/65.29; 903/902, 903
See application file for complete search history.

(56) References Cited

U.S. PATENT DOCUMENTS 6,687,580 B2 * 2/2004 Suzuki et al. .................... 701/22
6,889,126 B2 * 5/2005 Komiyama et al. ............. 701/22
(Continued)

FOREIGN PATENT DOCUMENTS

CN A-1636788 7/2005
CN A-101062654 10/2007
(Continued)

OTHER PUBLICATIONS

International Preliminary Report on Patentability issued in Application No. PCT/JP2009/060125; dated Aug. 10, 2010 (with translation).

(Continued)

*Primary Examiner* — Russell Frejd
(74) *Attorney, Agent, or Firm* — Oliff & Berridge, PLC (57) ABSTRACT

A vehicle includes a battery, an electric power reception unit receiving electric power from an electric power transmission unit external to the vehicle, and a motor generator driven by the electric power supplied from the battery and the electric power supplied from the electric power reception unit. The control device calculates the first electric power that can be output from the battery, calculates the second electric power that can be charged from outside based on the transmittable electric power of the electric power transmission unit and the chargeable electric power of the electric power reception unit, obtains the sum of the first electric power and the second electric power as electric power suppliable from a power supply, and performs drive control of a motor generator based on the electric power suppliable from a power supply.

6 Claims, 9 Drawing Sheets

U.S. PATENT DOCUMENTS

| | | | |
|---|---|---|---|
| 7,136,727 B2 * | 11/2006 | Seo et al. | 701/22 |
| 7,336,002 B2 * | 2/2008 | Kato et al. | 307/10.6 |
| 7,440,827 B2 * | 10/2008 | Kawada et al. | 701/22 |
| 7,497,285 B1 * | 3/2009 | Radev | 180/65.225 |
| 7,550,861 B2 * | 6/2009 | Oyobe et al. | 290/40 C |
| 7,795,844 B2 * | 9/2010 | Ichikawa et al. | 320/134 |
| 7,847,518 B2 * | 12/2010 | Ichikawa et al. | 320/109 |
| 7,989,978 B2 * | 8/2011 | Ichikawa | 307/9.1 |
| 8,035,252 B2 * | 10/2011 | Ichikawa et al. | 307/82 |
| 8,154,254 B2 * | 4/2012 | Ichikawa et al. | 320/134 |
| 2002/0019687 A1 * | 2/2002 | Suzuki et al. | 701/22 |
| 2004/0254695 A1 * | 12/2004 | Komiyama et al. | 701/22 |
| 2005/0134207 A1 | 6/2005 | Ishikawa | |
| 2006/0097670 A1 | 5/2006 | Fukasaku et al. | |
| 2007/0254776 A1 | 11/2007 | Wakashiro et al. | |
| 2012/0108386 A1 | 5/2012 | Wakashiro et al. | |

FOREIGN PATENT DOCUMENTS

| | | |
|---|---|---|
| JP | U-4-21102 | 2/1992 |
| JP | A-2001-197739 | 7/2001 |
| JP | A-2002-152996 | 5/2002 |
| JP | A-2006-174676 | 6/2006 |
| JP | A-2007-128778 | 5/2007 |

OTHER PUBLICATIONS

Written Opinion of the International Searching Authority issued in Application No. PCT/JP2009/060125; dated Aug. 11, 2009 (with translation).

Japanese Office Action issued in Application No. 2008-150661; dated Aug. 4, 2009 (with translation).

Japanese Office Action issued in Application No. 2008-150661; dated Mar. 9, 2010 (with translation).

A Kurs et al., "Wireless Power Transfer via Strongly Coupled Magnetic Resonances," *Science*, Jul. 6, 2007, vol. 317, pp. 83-86.

International Search Report issued in Application No. PCT/JP2009/060125; dated Aug. 11, 2009 (with translation).

* cited by examiner

VEHICLE AND METHOD FOR CONTROLLING THE SAME

TECHNICAL FIELD

The present invention relates to a vehicle and a method for controlling the vehicle, and particularly to a vehicle configured such that it can be externally supplied with electric power and a method for controlling the vehicle.

BACKGROUND ART

Electric trains are generally supplied with electric energy via cables. Also with regard to automobiles, it is similarly proposed to supply electric energy to a vehicle from road facilities through microwaves.

Japanese Patent Laying-Open No. 2006-174676 (Patent Document 1) discloses a non-contact power feed system using microwaves as described above. In this system, the vehicle is provided with a power storage device, in which the electric power transmitted from road facilities to the vehicle is determined based on the torque command value, the state of charge of the power storage device and receivable electric power through microwaves.

Furthermore, three technologies are known as promising wireless electric power transmission technologies such as electric power transmission using electromagnetic induction and electric power transmission by the resonance method, in addition to electric power transmission using radio waves such as microwaves.

Particularly, the resonance method utilizes the resonance in the electromagnetic field for electric power transmission, by which a large electric power of several kW can be transmitted for a relatively long distance (for example, several meters) (see Non-Patent Document 1).

PRIOR ART DOCUMENTS

Patent Documents

Patent Document 1: Japanese Patent Laying-Open No. 2006-174676
Patent Document 2: Japanese Utility Model Laying-Open No. 4-21102
Patent Document 3: Japanese Patent Laying-Open No. 2001-197736
Non-Patent Document 1: Andre Kurs et al., "Wireless Power Transfer via Strongly Coupled Magnetic Resonances" (on-line), Jul. 6, 2007, Science, Vol. 317, pp. 83-86 (searched Sep. 12, 2007), on the Internet <URL: http://www.sciencemag.org/cgi/reprint/317/5834/83.pdf>

SUMMARY OF THE INVENTION

Problems to be Solved by the Invention

In recent years, hybrid vehicles with improved fuel economy have been increasingly developed in consideration of the global environment for the purpose of reducing carbon dioxide emission, and the like.

It is also proposed to develop a vehicle that allows charging of the power storage device of the above-described hybrid vehicle from outside thereof. The hybrid vehicle is also configured such that it can be supplied with electric power from outside during driving, which allows a reduction in the capacity of the battery mounted therein.

However, with regard to power feeding during driving of the vehicle, there is no clear description about management of the electric power fed during driving. When the technique disclosed in the above-described Japanese Patent Laying-Open No. 2006-174676 is simply applied, there is a possibility that control cannot be appropriately performed to thereby cause an overvoltage and the like.

An object of the present invention is to provide a vehicle that allows appropriate management of power fed from outside during driving of the vehicle, and a method for controlling the vehicle.

Means for Solving the Problems

In summary, the present invention provides a vehicle including a power storage device; an electric power reception unit receiving electric power from an electric power transmission unit external to a vehicle; a first rotating electric machine driven by electric power supplied from the power storage device and electric power supplied from the electric power reception unit; and a control device for performing drive control of the first rotating electric machine. The control device calculates first electric power that can be output from the power storage device based on a state of the power storage device, calculates second electric power that can be charged from outside based on transmittable electric power of the electric power transmission unit and chargeable electric power of the electric power reception unit, obtains a sum of the first electric power and the second electric power as electric power suppliable from a power supply, and performs drive control of the first rotating electric machine based on the electric power suppliable from a power supply.

Preferably, the vehicle further includes a voltage conversion unit converting a first voltage output from the power storage device; and a rotating electric machine driving unit receiving a voltage converted by the voltage conversion unit to drive the first rotating electric machine. The electric power reception unit is connected to an electric power transfer path connecting between the voltage conversion unit and the rotating electric machine driving unit. The control device performs voltage conversion control for the voltage conversion unit based on a highest voltage among the first voltage output from the power storage device, a second voltage requested by the rotating electric machine driving unit and a third voltage requested by the electric power reception unit.

More preferably, the vehicle further includes an internal combustion engine; and a second rotating electric machine receiving power from the internal combustion engine to generate electric power used in the first rotating electric machine. The rotating electric machine driving unit drives the second rotating electric machine in addition to the first rotating electric machine, and requests the second voltage determined based on an operation of each of the first and second rotating electric machines.

Preferably, the vehicle further includes an internal combustion engine; a second rotating electric machine receiving power from the internal combustion engine to generate electric power used in the first rotating electric machine; a voltage conversion unit converting a first voltage output from the power storage device; and a rotating electric machine driving unit receiving a voltage converted by the voltage conversion unit to drive the first and second rotating electric machines. The rotating electric machine driving unit requests a second voltage determined based on an operation of each of the first and second rotating electric machines. The electric power reception unit is connected to a neutral point of a stator coil of the second rotating electric machine and a neutral point of a stator coil of the first rotating electric machine. The control device performs voltage conversion control for the voltage conversion unit based on a highest voltage among the first voltage output from the power storage device and the second voltage requested by the rotating electric machine driving unit, and on a third voltage requested by the electric power reception unit.

According to another aspect of the present invention, a method for controlling a vehicle is provided. The vehicle includes a power storage device, an electric power reception unit receiving electric power from an electric power transmission unit external to a vehicle, and a first rotating electric machine driven by electric power supplied from the power storage device and electric power supplied from the electric power reception unit. The method includes the steps of calculating first electric power that can be output from the power storage device based on a state of the power storage device; calculating second electric power that can be charged from outside based on transmittable electric power of the electric power transmission unit and chargeable electric power of the electric power reception unit; obtaining a sum of the first electric power and the second electric power as electric power suppliable from a power supply; and performing drive control of the first rotating electric machine based on the electric power suppliable from a power supply.

Preferably, the vehicle further includes a voltage conversion unit converting a first voltage output from the power storage device; and a rotating electric machine driving unit receiving a voltage converted by the voltage conversion unit to drive the first rotating electric machine. The electric power reception unit is connected to an electric power transfer path connecting between the voltage conversion unit and the rotating electric machine driving unit. The method further includes the step of performing voltage conversion control for the voltage conversion unit based on a highest voltage among the first voltage output from the power storage device, a second voltage requested by the rotating electric machine driving unit and a third voltage requested by the electric power reception unit.

More preferably, the vehicle further includes an internal combustion engine; and a second rotating electric machine receiving power from the internal combustion engine to generate electric power used in the first rotating electric machine. The rotating electric machine driving unit drives the second rotating electric machine in addition to the first rotating electric machine, and requests the second voltage determined based on an operation of each of the first and second rotating electric machines.

Preferably, the vehicle further includes an internal combustion engine; a second rotating electric machine receiving power from the internal combustion engine to generate electric power used in the first rotating electric machine; a voltage conversion unit converting a first voltage output from the power storage device; and a rotating electric machine driving unit receiving a voltage converted by the voltage conversion unit to drive the first and second rotating electric machines. The rotating electric machine driving unit requests a second voltage determined based on an operation of each of the first and second rotating electric machines. The electric power reception unit is connected to a neutral point of a stator coil of the second rotating electric machine and a neutral point of a stator coil of the first rotating electric machine. The method further includes the step of performing voltage conversion control for the voltage conversion unit based on a highest voltage among the first voltage output from the power storage device and the second voltage requested by the rotating electric machine driving unit, and on a third voltage requested by the electric power reception unit.

Effects of the Invention

The present invention allows appropriate power management for power feed from outside during driving of particularly a hybrid vehicle.

MODES FOR CARRYING OUT THE INVENTION

The embodiments of the present invention will be hereinafter described in detail with reference to the accompanying drawings, in which the same or corresponding components are designated by the same reference characters, and description thereof will not be repeated.

First Embodiment

Figure 1:
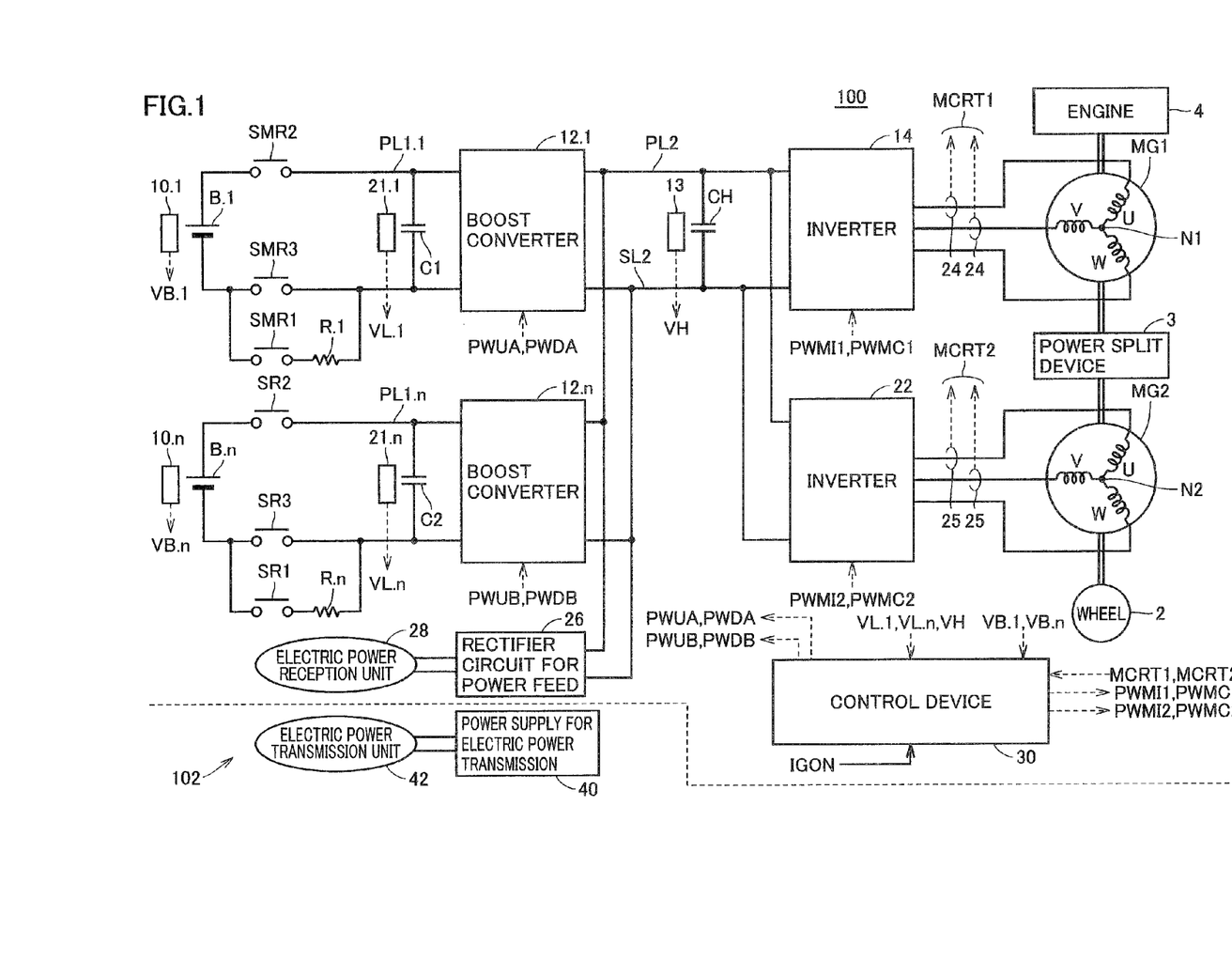
FIG. 1 is a diagram showing the main configuration of a vehicle 100 according to the embodiment of the present invention.

FIG. 1 is a diagram showing the main configuration of a vehicle 100 according to the embodiment of the present invention.

Referring to FIG. 1, a vehicle 100 includes batteries B.1 to B.n each serving as a power storage device; boost converters 12.1 to 12.n; smoothing capacitors C1, C2 and CH; voltage sensors 10.1 to 10.n, 13, 21.1 to 21.n; inverters 14 and 22; an engine 4; motor generators MG1 and MG2; a power split device 3; a wheel 2; and a control device 30. Inverters 14 and 22 may be integrated as an IPM (intelligent power module) and each operate as a driving unit for driving motor generators MG1 and MG2.

In a sub-power storage device (B.n) and a main power storage device (B.1), for example, the electric power storable capacity is set such that the maximum power allowed for the electrical load (inverter 22 and MG 2) connected to a power feed line can be output by simultaneously using these power storage devices. This allows driving of the vehicle with the maximum power during the EV (Electric Vehicle) running without using the engine. When the power storage state of the sub-power storage device is deteriorated, it is only necessary to exchange the sub-power storage device for further driving. When the electric power of the sub-power storage device is consumed, the engine is used in addition to the main power storage device, which allows driving with the maximum power even without using the sub-power storage device.

In order to further increase the distance for EV running, it is only necessary to add a further battery in parallel with battery B.n.

Preferably, this vehicle can be supplied with electric power from outside. For that purpose, vehicle 100 further includes, for example, an electric power reception unit 28 receiving electric power from road facilities 102 by the resonance method, and a rectifier circuit for power feed 26 rectifying the electric power received by electric power reception unit 28. The voltage rectified in rectifier circuit for power feed 26 is supplied to power feed lines PL2 and SL2.

Road facilities 102 include a power supply 40 for electric power transmission, and an electric power transmission unit 42 receiving electric power from power supply 40 for electric power transmission and transmitting the electric power to electric power reception unit 28 by the resonance method.

Smoothing capacitor C1 is connected between power feed line PL1.1 and ground line SL2. Voltage sensor 21.1 detects a voltage VL.1 across smoothing capacitor C1 and outputs the voltage to control device 30. Boost converter 12.1 boosts the voltage across the terminals of smoothing capacitor C1.

Smoothing capacitor C2 is connected between power feed line PL1.n and ground line SL2. Voltage sensor 21.n detects a voltage VL.n across smoothing capacitor C2 and outputs the voltage to control device 30. Boost converter 12.n boosts the voltage across the terminals of smoothing capacitor C2.

Smoothing capacitor CH smoothes the voltage boosted by boost converters 12.1 and 12.n. Voltage sensor 13 detects a voltage VH across the terminals of smoothing capacitor CH and outputs the voltage to control device 30.

Inverter 14 converts the direct-current (DC) voltage supplied from boost converter 12.1 or 12.n into a three-phase alternating-current (AC) voltage and outputs the voltage to motor generator MG1. Inverter 22 converts the DC voltage supplied from boost converter 12.1 or 12.n into a three-phase AC voltage and outputs the voltage to motor generator MG2.

Power split device 3 serves as a mechanism that is coupled to engine 4, motor generators MG1 and MG2 for distributing the power therebetween. For example, the power split device may be a planetary gear train having three rotation shafts of a sun gear, a planetary carrier and a ring gear. In the planetary gear train, when the rotation of each of the two rotation shafts among three rotation shafts is set, the rotation of the remaining one rotation shaft is automatically set. These three rotation shafts are connected to the rotation shafts of engine 4, motor generators MG1 and MG2, respectively. It is to be noted that the rotation shaft of motor generator MG2 is coupled to wheel 2 by a reduction gear and a differential gear which are not shown. Furthermore, a gear reducer for the rotation shaft of motor generator MG2 may be further incorporated into power split device 3.

Vehicle 100 further includes a system main relay SMR1 connected between the positive terminal of battery B.1 and power feed line PL1.1; a system main relay SMR3 connected between the negative terminal (a ground line SL1) of battery B.1 and a node N2; and a system main relay SMR1 and a limiting resistance R.1 which are connected in series and also connected in parallel with system main relay SMR3.

System main relays SMR1 to SMR3 are controlled such that they are brought into a conducting/non-conducting state in accordance with the control signal supplied from control device 30.

Voltage sensor 10.1 measures a voltage VB.1 across the terminals of battery B.1. Although not shown, a current sensor for detecting the current flowing through battery B.1 is provided in order to monitor the state of charge of battery B.1 together with voltage sensor 10.1. Battery B.1 may be, for example, a secondary battery such as a lead-acid battery, a nickel-metal-hydride battery and a lithium-ion battery, a large capacity capacitor such as an electrical double layer capacitor.

Vehicle 100 further includes a relay SR2 connected between the positive electrode of battery B.n and a power feed line PL1.n; a relay SR3 connected between the negative electrode of battery B.n and ground line SL2; and a relay SR1 and a limiting resistance R.n which are connected in series and also connected in parallel with relay SR3.

Relays SR1 to SR3 are controlled such that they are brought into the conducting/non-conducting state in accordance with the control signal supplied from control device 30. As described later, ground line SL2 extends through boost converters 12.1 and 12.n toward inverters 14 and 22.

Voltage sensor 10.n measures a voltage VB.n across the terminals of battery B.n. Although not shown, a current sensor for detecting the current flowing through each battery is provided in order to monitor the state of charge of battery B.n together with voltage sensor 10.n. Battery B.n may be, for example, a secondary battery such as a lead-acid battery, a nickel-metal-hydride battery and a lithium-ion battery, a large capacity capacitor such as an electrical double layer capacitor.

Inverter 14 is connected to power feed line PL2 and ground line SL2. Inverter 14 receives the boosted voltage from boost converters 12.1 and 12.n to drive motor generator MG1 in order to start engine 4, for example. Furthermore, inverter 14 transmits, back to boost converters 12.1 and 12.n, the electric power generated in motor generator MG1 by the power transmitted from engine 4. In this case, boost converters 12.1 and 12.n are controlled by control device 30 so as to operate as a step-down circuit.

Current sensor 24 detects the current flowing through motor generator MG1 as a motor current value MCRT1 and outputs motor current value MCRT1 to control device 30.

Inverter 22 is arranged in parallel with inverter 14, each of which is connected to power feed line PL2 and ground line SL2. Inverter 22 converts the DC voltage output from boost converters 12.1 and 12.n into a three-phase AC voltage, and outputs the voltage to motor generator MG2 that drives wheel 2. Furthermore, inverter 22 transmits the electric power generated in motor generator MG2 back to boost converters 12.1 and 12.n in accordance with regenerative braking. In this case, boost converters 12.1 and 12.n are controlled by control device 30 so as to operate as a step-down circuit.

Current sensor 25 detects the current flowing through motor generator MG2 as a motor current value MCRT2, and outputs motor current value MCRT2 to control device 30.

Control device 30 receives each torque command value and each rotation speed of motor generators MG1 and MG2, each value of voltages VB.1 to VB.n, VL.1 to VL.n and VH, motor current values MCRT1 and MCRT2, and a start-up signal IGON. Control device 30 then outputs a control signal PWDB for instructing boost converter 12.n to boost the voltage, a control signal PWDB for instructing to lower the voltage, and a shutdown signal for instructing inhibition of the operation.

Furthermore, control device 30 outputs a control signal PWMI1 for giving a drive instruction to inverter 14 to convert the DC voltage output from each of boost converters 12.1 and 12.n into an AC voltage for driving motor generator MG1; and a control signal PWMC1 for giving a regenerative instruction to convert the AC voltage generated in motor generator MG1 into a DC voltage and transmit the same back toward boost converters 12.1 and 12.n.

Similarly, control device 30 outputs a control signal PWMI2 for giving a drive instruction to inverter 22 to convert the DC voltage into an AC voltage for driving motor generator MG2; and a control signal PWMC2 for giving a regenerative instruction to convert the AC voltage generated in motor generator MG2 into a DC voltage and transmit the same back toward boost converters 12.1 and 12.n.

Figure 2:
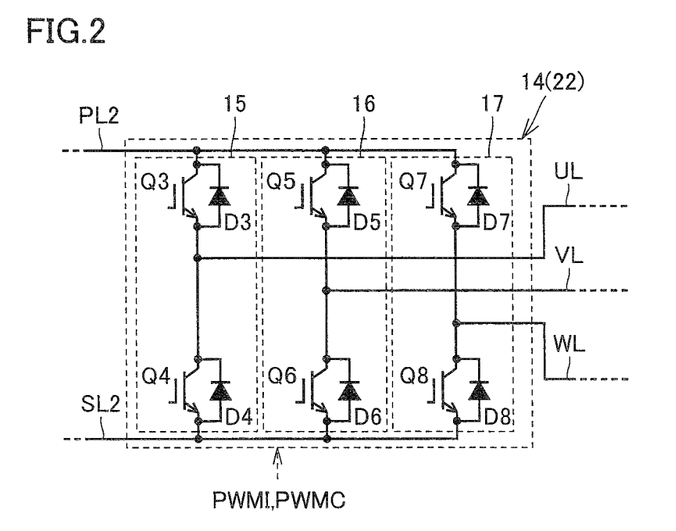
FIG. 2 is a circuit diagram showing the detailed configuration of inverters 14 and 22 in FIG. 1.

FIG. 2 is a circuit diagram showing the detailed configuration of inverters 14 and 22 in FIG. 1.

Referring to FIGS. 1 and 2, inverter 14 includes a U-phase arm 15, a V-phase arm 16 and a W-phase arm 17. U-phase arm 15, V-phase arm 16 and W-phase arm 17 are connected in parallel between power feed line PL2 and ground line SL2.

U-phase arm 15 includes IGBT elements Q3 and Q4 connected in series between power feed line PL2 and ground line SL2, and diodes D3 and D4 connected in parallel with IGBT elements Q3 and Q4, respectively. Diode D3 has a cathode connected to a collector of IGBT element Q3, and an anode connected to an emitter of IGBT element Q3. Diode D4 has a cathode connected to a collector of IGBT element Q4, and an anode connected to an emitter of IGBT element Q4.

V-phase arm 16 includes IGBT elements Q5 and Q6 connected in series between power feed line PL2 and ground line SL2, and diodes D5 and D6 connected in parallel with IGBT elements Q5 and Q6, respectively. Diode D5 has a cathode connected to a collector of IGBT element Q5, and an anode connected to an emitter of IGBT element Q5. Diode D6 has a cathode connected to a collector of IGBT element Q6, and an anode connected to an emitter of IGBT element Q6.

W-phase arm 17 includes IGBT elements Q7 and Q8 connected in series between power feed line PL2 and ground line SL2, and diodes D7 and D8 connected in parallel with IGBT elements Q7 and Q8, respectively. Diode D7 has a cathode connected to a collector of IGBT element Q7, and an anode connected to an emitter of IGBT element Q7. Diode D8 has a cathode connected to a collector of IGBT element Q8, and an anode connected to an emitter of IGBT element Q8.

An intermediate point of each phase arm is connected to each phase end of each phase coil of motor generator MG1. In other words, motor generator MG1 serves as a three-phase permanent magnet synchronous motor in which three coils of the U-, V- and W-phases each have one end connected in common to a neutral point. The other end of the U-phase coil is connected to a line UL led from the connection node of IGBT elements Q3 and Q4. The other end of the V-phase coil is also connected to a line VL led from the connection node of IGBT elements Q5 and Q6. The other end of the W-phase coil is also connected to a line WL led from the connection node of IGBT elements Q7 and Q8.

Inverter 22 in FIG. 1 is different from inverter 14 in that it is connected to motor generator MG2 but identical in the internal circuit configuration to inverter 14, and accordingly, detailed description thereof will not be repeated. Furthermore, FIG. 2 shows that control signals PWMI and PWMC are supplied to the inverter for the purpose of avoiding complicated description, in which case control signals PWMI1, PWMC1 and control signals PWMI2, PWMC2 are input into inverters 14 and 22, respectively, as shown in FIG. 1.

Figure 3:
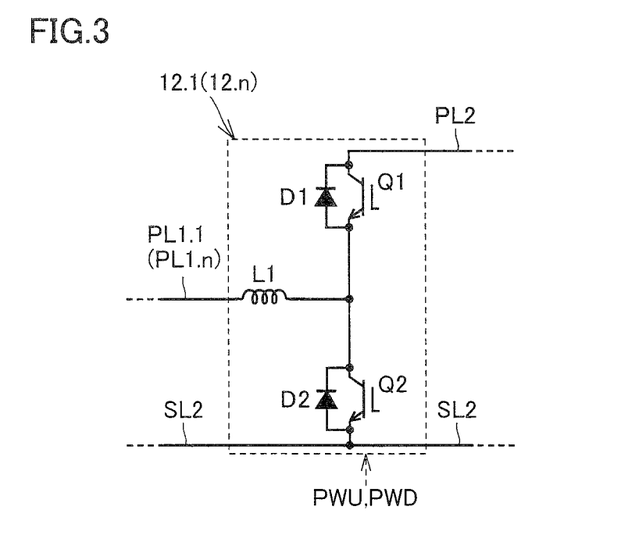
FIG. 3 is a circuit diagram showing the detailed configuration of boost converters 12.1 and 12.n in FIG. 1.

FIG. 3 is a circuit diagram showing the detailed configuration of boost converters 12.1 and 12.n in FIG. 1.

Referring to FIGS. 1 and 3, boost converter 12.1 includes a reactor L1 having one end connected to power feed line PL1.1; IGBT elements Q1 and Q2 connected in series between power feed line PL2 and ground line SL2; and diodes D1 and D2 connected in parallel to IGBT elements Q1 and Q2, respectively.

Reactor L1 has the other end connected to an emitter of IGBT element Q1 and a collector of IGBT element Q2. Diode D1 has a cathode connected to a collector of IGBT element Q1, and an anode connected to an emitter of IGBT element Q1. Diode D2 has a cathode connected to a collector of IGBT element Q2, and an anode connected to an emitter of IGBT element Q2.

Boost converter 12.1 in FIG. 1 is different from boost converter 12.1 in that it is connected to power feed line PL1.n in place of power feed line PL1.1 but identical in the internal circuit configuration to boost converter 12.1, and accordingly, detailed description thereof will not be repeated. Furthermore, FIG. 3 shows that control signals PWU and PWD are supplied to the boost converter for the purpose of avoiding complicated description, in which case control signals PWUA, PWDA and control signals PWUB, PWDB are input into boost converters 12.1 and 12.n, respectively, as shown in FIG. 1.

Figure 4:
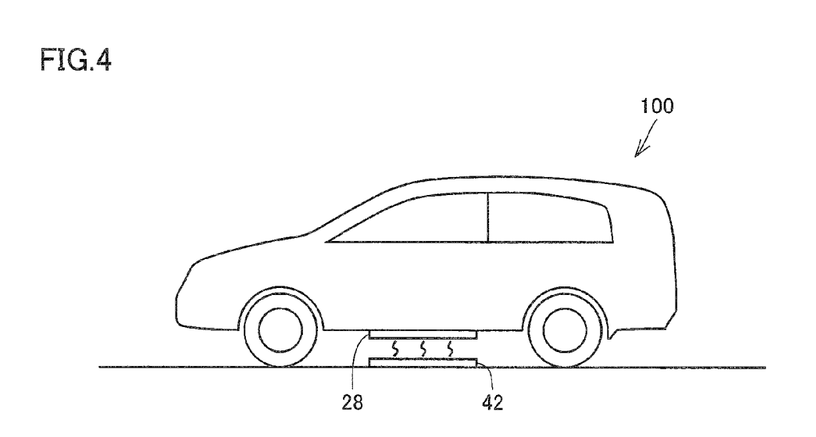
FIG. 4 is a diagram illustrating the state where energy is fed between road facilities and a vehicle in a non-contact manner.

FIG. 4 is a diagram illustrating the state where energy is fed between road facilities and a vehicle in a non-contact manner.

Referring to FIG. 4, although not shown, electric power transmission unit 42 installed on the road includes a high-frequency electric power driver, a primary coil and a primary self-resonant coil.

Power supply 40 for electric power transmission serves as a power supply external to the vehicle, which may be, for example, a system power supply. The high-frequency electric power driver causes magnetic field resonance to convert the electric power received from power supply 40 for electric power transmission into a high-frequency electric power that can be transmitted from the primary self-resonant coil to the secondary self-resonant coil on the vehicle side, and then supply the converted high-frequency electric power to the primary coil.

The primary coil is configured to allow electric power transmission to the primary self-resonant coil by electromagnetic induction and preferably disposed coaxially with the primary self-resonant coil. The primary coil then outputs the electric power received from the high-frequency electric power driver to the primary self-resonant coil.

The primary self-resonant coil is disposed in proximity to the ground. This primary self-resonant coil is an LC resonant coil having both ends opened.

Vehicle 100 receives the electric power at electric power reception unit 28 installed on the underside of the floor of the vehicle body. Electric power reception unit 28 includes a secondary self-resonant coil.

The primary self-resonant coil is magnetically coupled to the secondary self-resonant coil by the magnetic field resonance and configured to allow electric power transmission to the secondary self-resonant coil.

It is to be noted that electric power transmission unit 42 installed on the road may be a power transmission antenna which emits radio waves such as microwaves, for example. Furthermore, electric power reception unit 28 may be a microwave receiving antenna, for example.

In order to allow continuous power feed to the vehicle also during driving thereof, a plurality of electric power transmission units 42 are provided along the direction in which the road extends. If the vehicle needs to be supplied with electric power only at a predetermined position where the vehicle is brought to a stop, a single electric power transmission unit 42 may be sufficient.

Figure 5:
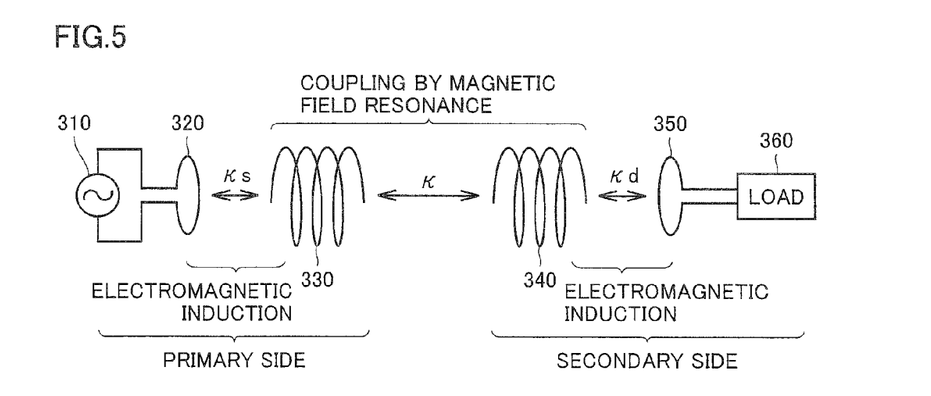
FIG. 5 is a diagram illustrating the principle of electric power transmission by the resonance method.

FIG. 5 is a diagram illustrating the principle of electric power transmission by the resonance method.

Referring to FIG. 5, in this resonance method, two LC resonant coils having the same natural frequency resonate via the magnetic field similarly to resonance of two tuning forks, thereby causing the electric power to be wirelessly transmitted from one coil to the other coil.

When a high-frequency power supply 310 supplies high-frequency electric power into primary coil 320, a magnetic field is generated in primary coil 320 and high-frequency electric power is generated in primary self-resonant coil 330 by electromagnetic induction. Primary self-resonant coil 330 functions as an LC resonator by the inductance of its own and the stray capacitance between conductive wires. Primary self-resonant coil 330 is also magnetically coupled by magnetic field resonance to a secondary self-resonant coil 340 similarly functioning as an LC resonator and having the same resonance frequency as that of primary self-resonant coil 330, to thereby transmit the electric power to secondary self-resonant coil 340.

Then, the electric power received from primary self-resonant coil 330 causes generation of a magnetic field in secondary self-resonant coil 340, which causes generation of a high-frequency electric power in a secondary coil 350 by electromagnetic induction, and then, electric power is supplied to a load 360.

With regard to the correspondence relation with FIG. 1, power supply 40 for electric power transmission in FIG. 1 corresponds to high-frequency power supply 310 in FIG. 5. Furthermore, electric power transmission unit 42 in FIG. 1 corresponds to primary coil 320 and primary self-resonant coil 330 in FIG. 5. Electric power reception unit 28 in FIG. 1 corresponds to secondary self-resonant coil 340 and secondary coil 350 in FIG. 5. Rectifier circuit for power feed 26 in FIG. 1 corresponds to load 360 in FIG. 2.

Figure 6:
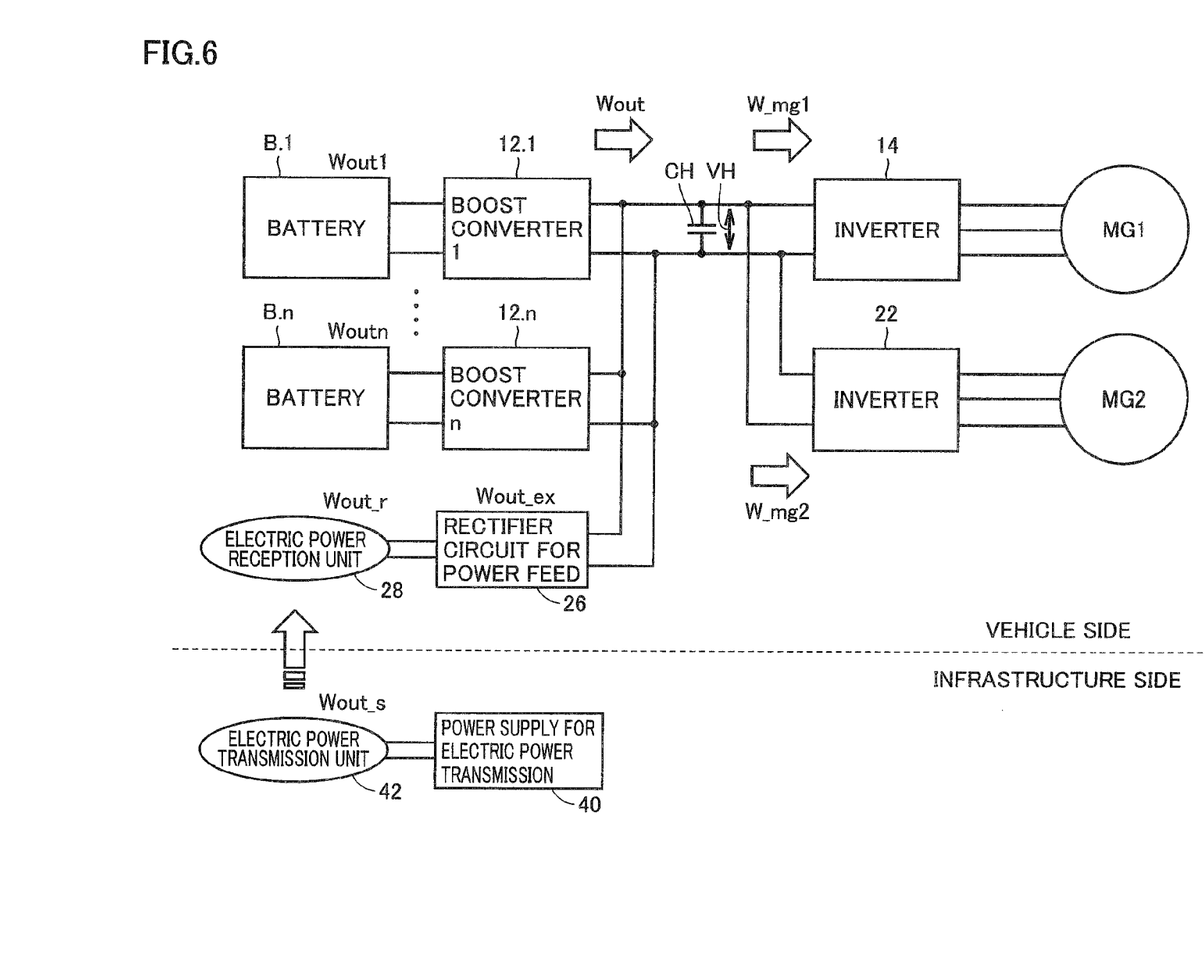
FIG. 6 is a diagram schematically showing the configuration shown in FIG. 1 for the purpose of explaining power feed.

FIG. 6 is a diagram schematically showing the configuration shown in FIG. 1 for explaining power feed.

As shown in FIG. 6, in the system allowing electric power fed from outside during driving of the vehicle, a maximum electric power Wout that can be output by a vehicle power supply is calculated based on transmittable electric power Wout_s of the road facilities, receivable electric power Wout_r on the electric power reception side, and allowable output electric power Wout1 to Woutn of a plurality of batteries.

Transmittable electric power Wout_s of the road facilities may be different depending on the location where the vehicle runs. Therefore, the information thereof is obtained from the road facilities wirelessly or the like. Receivable electric power Wout_r on the electric power reception side is determined based on the ability of the device mounted on each vehicle.

The smaller of transmittable electric power Wout_s and receivable electric power Wout_r is electric power Wout_ex that can be supplied from the rectifier circuit for power feed.

Allowable output electric power Wout1 to Woutn of the batteries can be obtained from, for example, maps and the like referring to the temperature, the state of charge SOC, age deterioration and the like of each battery as parameters.

Furthermore, in order to maintain the controllability of the motor and to prevent the backflow of the current, a boost voltage VH is set at a voltage, as a target voltage, that is higher than the voltage of each of a plurality of batteries, the motor voltage (counter-electromotive force) calculated based on motor generators MG1 and MG2, and the voltage requested by the electric power reception unit.

For example, boost converter 12.1 is controlled so as to maintain this target voltage, while remaining boost converters 12.2 to 12.n are current-controlled to output their respective electric power Wout2 to electric power Woutn.

Figure 7:
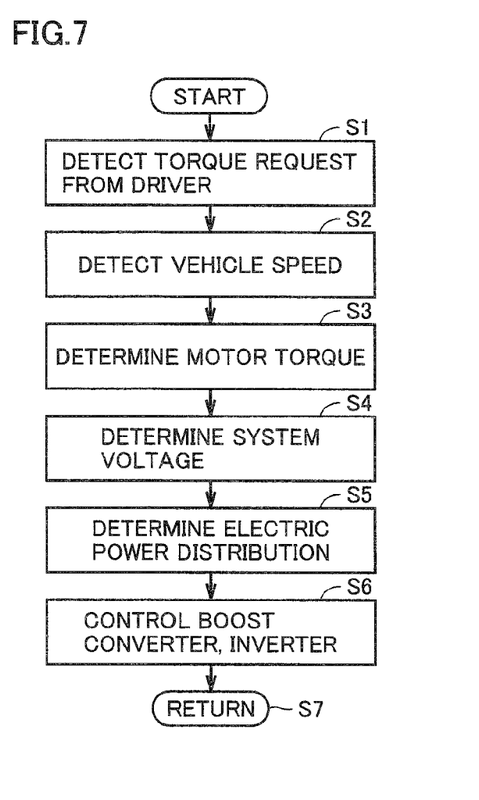
FIG. 7 is a flowchart illustrating the outline of vehicle control performed by a control device 30 in FIG. 1.

FIG. 7 is a flowchart illustrating the outline of vehicle control performed by control device 30 in FIG. 1. The process of this flowchart is called from a predetermined main routine and executed at regular time intervals or every time the predetermined condition is satisfied.

Referring to FIGS. 1 and 7, in step S1, the torque requested by the driver is first detected. For example, the accelerator press-down degree sensor detects the degree of pressing down of an accelerator pedal. Based on this, the torque requested by the driver may be determined using maps and the like.

Then, the vehicle speed is detected in step S2. The vehicle speed can be detected by a sensor detecting the rotation speed of the propeller shaft and the rotation speed of the wheel, for example.

In step S3, a motor torque is determined based on the requested torque obtained in step S1 and the vehicle speed detected in step S2.

In step S4, a control target value of voltage VH corresponding to a system voltage is determined. In step S5, it is determined how the electric power fed from each battery and the electric power fed from outside are distributed.

Finally, in step S6, boost converters 12.1 to 12.n and inverters 14 and 22 are controlled so as to implement distribution of the system voltage and electric power. Then, in step S7, control is passed to the main routine.

Figure 8:
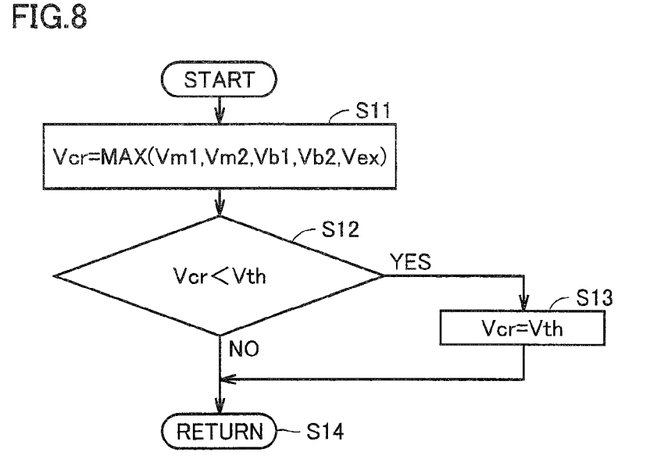
FIG. 8 is a diagram showing a system voltage determination process performed in step S4 in FIG. 7.

FIG. 8 is a diagram showing a system voltage determination process performed in step S4 in FIG. 7.

Referring to FIG. 8, when the process is first started, a boost voltage command value Vcr is determined in step S11 based on the following equation (1).

$$Vcr = \text{MAX}(Vm1, Vm2, Vb1, Vb2, Vex) \quad (1)$$

In this case, Vm1 represents a voltage requested in order to operate motor generator MG1, and Vm2 represents a voltage requested in order to operate motor generator MG2. Furthermore, Vb1 and Vb2 each represent a voltage of the battery. The case where two batteries are used is illustrated by way of example. If n batteries are used, Vb1 to Vbn are listed. Furthermore, Vex represents a voltage required when the external power feed unit transmits and receives electric power. Furthermore, MAX( ) represents that the maximum value is selected.

Then, in step S12, it is determined whether boost voltage command value Vcr obtained in step S11 is lower than lowest boost voltage Vth. Lowest boost voltage Vth represents a value that is determined by the performance of the boost converter, and also corresponds to a lower limit voltage that allows the boost converter to controllably maintain the boost operation.

In step S12, if the condition of Vcr<Vth is satisfied, the process proceeds to step S13, in which boost voltage command value Vcr is set at lowest boost voltage Vth. Then, the process proceeds to step S14 If the condition of Vcr<Vth is not satisfied in step S12, the process in step S13 is not performed but the process proceeds to step S14, and boost voltage command value Vcr calculated in step S11 is used without change.

Figure 9:
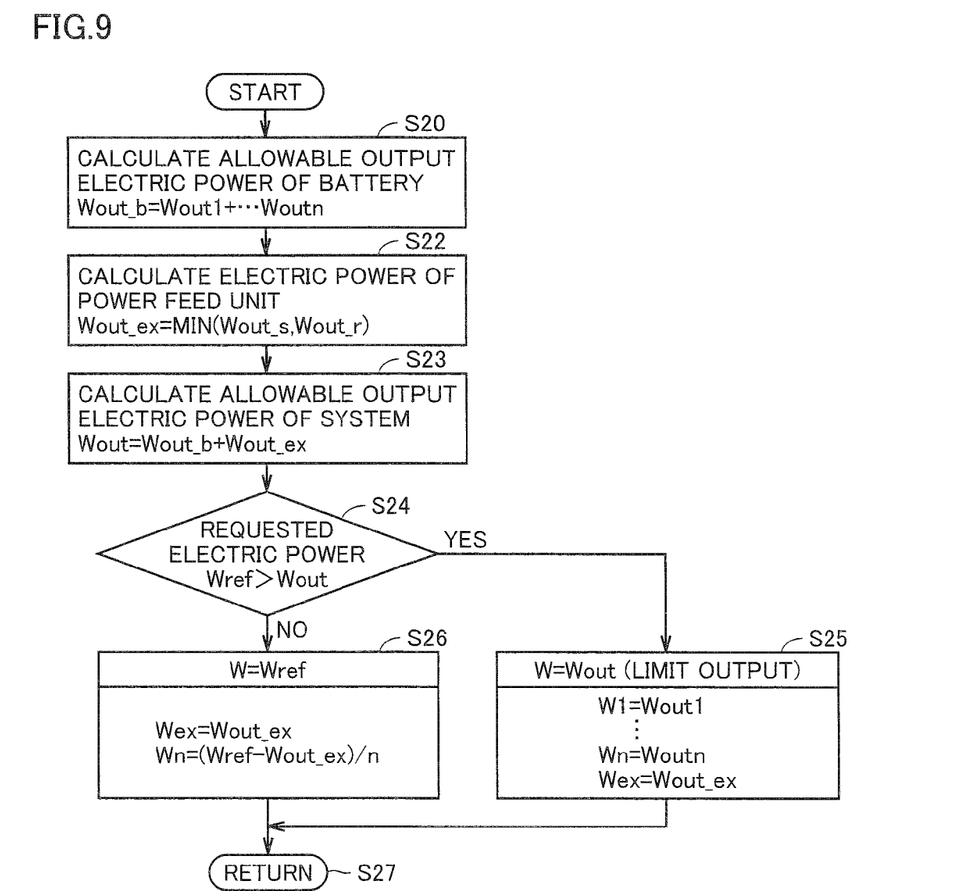
FIG. 9 is a diagram showing the details of an electric power distribution process in step S5 in FIG. 7.

FIG. 9 is a diagram showing the details of an electric power distribution process in step S5 in FIG. 7.

Referring to FIG. 9, when the process is first started, an allowable output electric power Wout_b of the battery is calculated in step S20 based on the following equation (2).

$$Wout\_b = Wout1 + \ldots + Woutn \quad (2)$$

In this case, Wout1 and Woutn each represent the electric power that can be output from batteries B.1 and B.n, respectively. Based on the battery temperature, the state of charge SOC, the degree of deterioration of the battery and the like, Wout1 and Woutn are obtained from maps and the like.

Then, in step S22, electric power Wout_ex of the power feed unit is calculated based on the following equation (3).

$$Wout\_ex = MIN(Wout\_s, Wout\_r) \quad (3)$$

Transmittable electric power Wout_s of road facilities may be different depending on the location where the vehicle runs. Therefore, the information thereof is obtained from road facilities wirelessly or the like. Receivable electric power Wout_r on the electric power reception side is a constant since it is determined based on the ability of the device mounted on each vehicle.

Furthermore, MIN( ) represents that the smaller of transmittable electric power Wout_s and receivable electric power Wout_r is set as electric power Wout_ex that can be fed from the rectifier circuit for power feed.

Particularly, it is conceivable that vehicles run in various locations in contrast to electric trains. Accordingly, feedable electric power Wout_ex is set to be variable, which allows the vehicle to be fed with the maximum electric power that can be fed in each location where the vehicle runs.

Then, allowable output electric power Wout of the system is calculated in step S23 based on the following equation (4).

$$Wout = Wout\_b + Wout\_ex \quad (4)$$

Then in step S24, requested electric power Wref is compared with allowable output electric power Wout of the system. Requested electric power Wref is determined based on the information obtained in steps S1 to S3 in FIG. 7, and also requested by the power supply device of the vehicle in order to implement the request from the driver.

When the condition of Wref>Wout is satisfied in step S24, the requested electric power exceeds the allowable output electric power. Accordingly, the process proceeds to step S25 in which output electric power W is limited.

In other words, the condition of W=Wout is established, and output electric power W1 to output electric power Wn output from each battery are set at allowable output electric power Wout1 to allowable output electric power Woutn, respectively. Then, electric power Wex fed from outside is set at feedable electric power Wout_ex.

If the condition of Wref>Wout is not satisfied in step S24, the process proceeds to step S26 and the electric power set as requested electric power Wref is assumed as output electric power W.

Then, all electric power Wout_ex that can be fed from outside is received and used. In other words, the condition of Wex=Wout_ex is established. A shortage of electric power is supplemented by equally supplying the electric power from the batteries. A surplus of electric power is equally supplied to the batteries for charging. When each battery shows a different capacity or SOC, the power distribution ratio may be changed.

When the electric power distribution is determined in step S25 or S26, the process proceeds to step S27. Then, the control of the boost converter and the inverter in step S6 in FIG. 7 is carried out based on the determined electric power distribution.

In the above-described embodiments, the power running operation of the motor generator has been described. Similar distribution may be carried out also in the case where the electric power is transmitted back to the battery or to the outside in the regenerative running operation. In this case, assuming that the chargeable voltage is Win, the above-described equation may be applied by replacing "Wout" with "Win".

As described above, in the first embodiment, electric power management is appropriately performed in the vehicle provided with a plurality of batteries and receiving electric power from outside during running.

Second Embodiment

Figure 10:
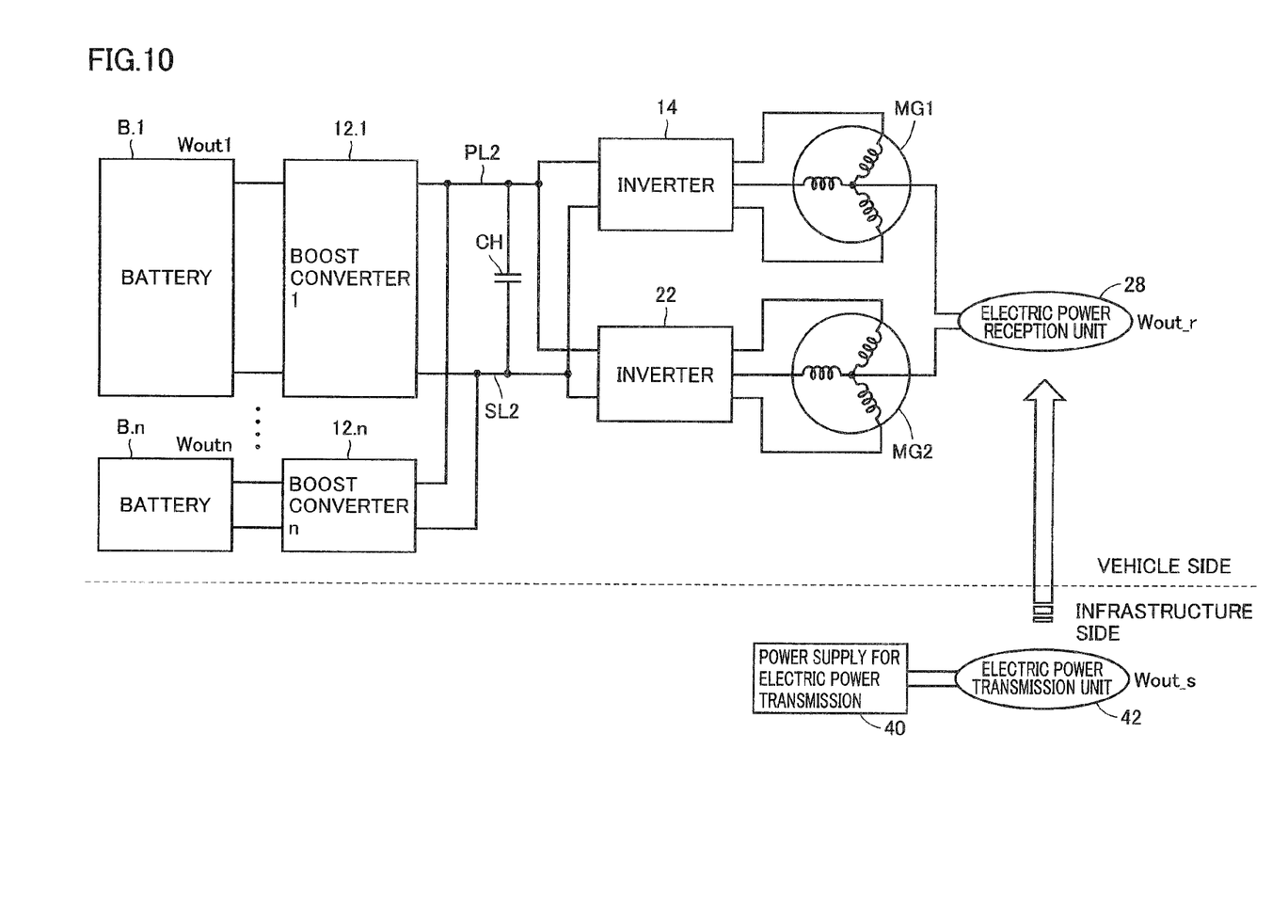
FIG. 10 is a diagram showing the schematic configuration of the vehicle in the second embodiment.

FIG. 10 is a diagram showing the schematic configuration of the vehicle in the second embodiment.

The vehicle shown in FIG. 10 is different from the vehicle shown in FIG. 6 in the configuration that rectifier circuit for power feed 26 connected to the power line pair between boost converter 12 and inverter 14 is eliminated and electric power reception unit 28 is connected to the neutral point of the stator coil of each of motor generators MG1 and MG2. Since the battery and the boost converter are identical to those in FIG. 6, detailed description thereof will not be repeated.

In the configuration shown in FIG. 10, the electric power fed from power supply 40 for electric power transmission on the road facilities through electric power transmission unit 42 to the electric power reception unit in a non-contact manner is applied between the neutral point of the stator coil of motor generator MG1 and the neutral point of the stator coil of motor generator MG2.

Figure 11:
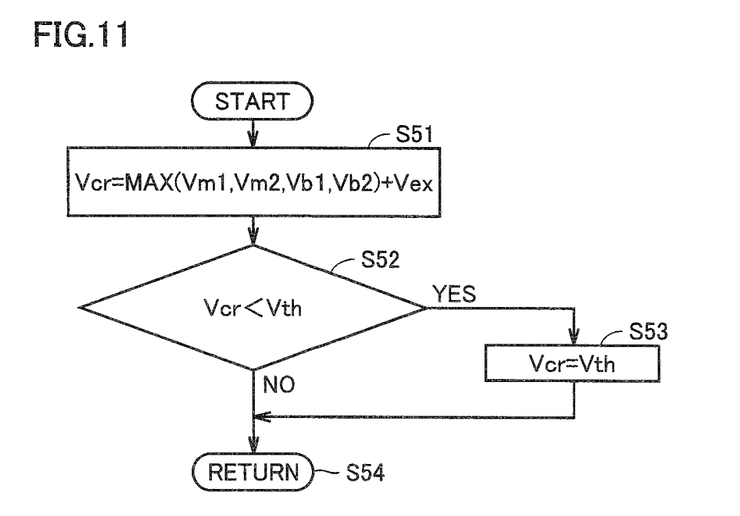
FIG. 11 is a flowchart for illustrating the system voltage determination process in step S4 in FIG. 7 in the second embodiment.

FIG. 11 is a flowchart for illustrating the system voltage determination process in step S4 in FIG. 7 in the second embodiment.

Referring to FIG. 11, when the process is first started, a boost voltage command value Vcr is determined in step S51 based on the following equation (5).

$$Vcr = MAX(Vm1, Vm2, Vb1, Vb2) + Vex \quad (5)$$

In this case, Vm1 represents a voltage requested in order to operate motor generator MG1, and Vm2 represents a voltage requested in order to operate motor generator MG2. Furthermore, Vb1 and Vb2 each represent a voltage of the battery. The case where two batteries are used is illustrated by way of example. If n batteries are used, Vb1 to Vbn are listed. Furthermore, Vex represents a voltage required when the external power feed unit transmits and receives electric power. Furthermore, MAX( ) represents that the maximum value is selected.

Then, in step S52, it is determined whether boost voltage command value Vcr obtained in step S51 is lower than a lowest boost voltage Vth. Lowest boost voltage Vth represents a value that is determined by the performance of the boost converter, and also corresponds to a lower limit voltage that allows the boost converter to controllably maintain the boost operation.

In step S52, if the condition of Vcr<Vth is satisfied, the process proceeds to step S53, in which boost voltage command value Vcr is set at lowest boost voltage Vth. Then, the process proceeds to step S54. If the condition of Vcr<Vth is not satisfied in step S52, the process in step S53 is not performed but the process proceeds to step S54, and boost voltage command value Vcr calculated in step S51 is used without change.

Figure 12:
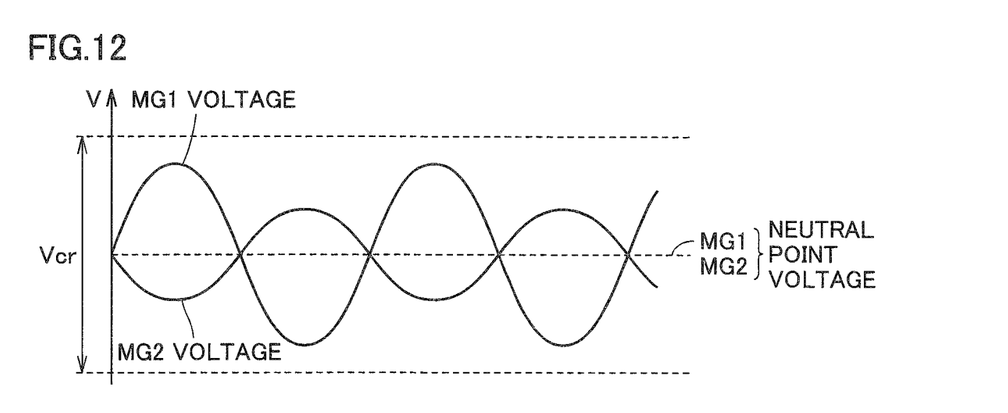
FIG. 12 is the first waveform diagram for illustrating the determination of a boost voltage command value in step S51 in FIG. 11.

FIG. 12 is the first waveform diagram for illustrating the determination of a boost voltage command value in step S51 in FIG. 11.

Figure 13:
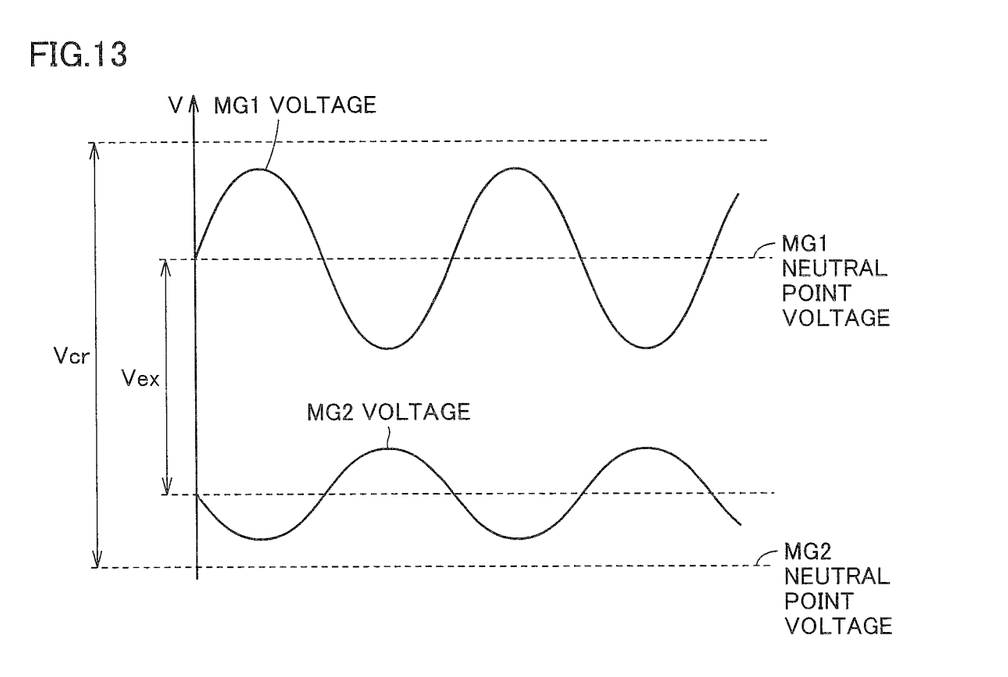
FIG. 13 is the second waveform diagram for illustrating the determination of the boost voltage command value in step S51 in FIG. 11.

FIG. 13 is the second waveform diagram for illustrating the determination of the boost voltage command value in step S51 in FIG. 11.

FIG. 12 shows the case where electric power is not supplied from outside, in which the voltage at the neutral point of the stator coil of motor generator MG1 is identical to the voltage at the neutral point of the stator coil of motor generator MG1. In this case, boost voltage command value Vcr is determined such that the voltage having greater amplitude among voltage Vm1 of motor generator MG1 and voltage Mm2 of motor generator MG2 can be covered.

FIG. 13 shows the case where a power feed voltage Vex from outside is applied between the neutral point voltage of motor generator MG1 and the neutral point voltage of motor generator MG2. In this case, the motor control can be excellently performed when the voltage obtained by adding power feed voltage Vex to the voltage having greater amplitude among voltage Vm1 of motor generator MG1 and voltage Vm2 of motor generator MG2 is set as boost voltage command value Vcr.

Finally, again referring to FIG. 1 and the like, the embodiments of the present application will be summarized. Vehicle 100 includes battery B.1 serving as a power storage device; electric power reception unit 28 receiving electric power from electric power transmission unit 42 external to the vehicle; the first rotating electric machine (motor generator MG2) driven by the electric power supplied from the power storage device and the electric power supplied from electric power reception unit 28; and control device 30 performing drive control of the first rotating electric machine. As shown in FIGS. 6 and 9, control device 30 calculates first electric power Wout_b that can be output from the power storage device based on the state of the power storage device, calculates second electric power Wout_ex that can be charged from outside based on transmittable electric power Wout_s of the electric power transmission unit and receivable electric power Wout_r of the electric power reception unit, obtains the sum of the first electric power and the second electric power as electric power Wout suppliable from a power supply, and performs drive control of the first rotating electric machine based on electric power Wout suppliable from a power supply.

Preferably, vehicle 100 further includes a voltage conversion unit (boost converter 12.1) converting the first voltage output from the power storage device, and a rotating electric machine driving unit (inverters 14 and 22) receiving the voltage converted by the voltage conversion unit and driving the first rotating electric machine. Electric power reception unit 28 is connected to an electric power transfer path (PL2, SL2) which connects between the voltage conversion unit and the rotating electric machine driving unit. As shown in FIG. 8, control device 30 performs voltage conversion control for the voltage conversion unit based on the highest voltage among the first voltage (Vb1, Vb2) output from the power storage device, the second voltage (Vm1, Vm2) requested by the rotating electric machine driving unit and the third voltage (Vex) requested by electric power reception unit 28.

More preferably, vehicle 100 further includes an internal combustion engine (engine 4); and the second rotating electric machine (motor generator MG1) receiving power from the internal combustion engine to generate electric power used in the first rotating electric machine (motor generator MG2). The rotating electric machine driving unit (inverters 14 and 22) drives the second rotating electric machine in addition to the first rotating electric machine, and requests the second voltage (Vm1, Vm2) determined based on the operation of each of the first and second rotating electric machines.

Preferably, vehicle 100 includes an internal combustion engine (engine 4); the second rotating electric machine (motor generator MG1) receiving power from the internal combustion engine to generate electric power used in the first rotating electric machine (motor generator MG2); a voltage conversion unit (boost converter 12.1) converting the first voltage output from the power storage device; and a rotating electric machine driving unit (inverters 14 and 22) receiving the voltage converted by the voltage conversion unit to drive the first and second rotating electric machines. The rotating electric machine driving unit requests the second voltage (Vm1, Vm2) determined based on the operation of each of the first and second rotating electric machines. As shown in FIG. 10, the electric power reception unit is connected to a neutral point N1 of the stator coil of the second rotating electric machine and a neutral point N2 of the stator coil of the first rotating electric machine. As shown in FIG. 11, control device 30 performs voltage conversion control for the voltage conversion unit based on the highest voltage among the first voltage (Vb1, Vb2) output from the power storage device and the second voltage (Vm1, Vm2) requested by the rotating electric machine driving unit, and on the third voltage (Vex) requested by the electric power reception unit.

Although the present embodiments have shown examples in which the resonance method is used as an electric power transmission method, the method is not limited thereto as long as electric power can be wirelessly transmitted. The method by electromagnetic induction or using radio waves such as microwaves may be employed.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

DESCRIPTION OF THE REFERENCE SIGNS 2 wheel, 3 power split device, 4 engine, 10.1 to 10.N, 13, 21.1 to 21.$n$ voltage sensor, 12.1 to 12.$n$ boost converter, 14, 22 inverter, 15 U-phase arm, 16 V-phase arm, 17 W-phase arm, 24, 25 current sensor, 26 rectifier circuit for power feed, 28 electric power reception unit, 30 control device, 40 power supply for electric power transmission, 42 electric power transmission unit, 100 vehicle, 102 road facilities, B.1 to B.n battery, C1, C2, CH smoothing capacitor, D1 to D8 diode, L1 reactor, MG1, MG2 motor generator, PL2 power feed line, Q1 to Q8 IGBT element, R limiting resistance, SL1, SL2 ground line, SMR1 to SMR3 system main relay, SR1 to SR3 relay.

The invention claimed is:

1. A vehicle comprising:
a power storage device;
an electric power reception unit receiving electric power from an electric power transmission unit external to a vehicle;
a first rotating electric machine driven by electric power supplied from said power storage device and electric power supplied from said electric power reception unit; and
a control device for performing drive control of said first rotating electric machine, said control device calculating first electric power that can be output from said power storage device based on a state of said power storage device, calculating second electric power that can be charged from outside based on transmittable electric power of said electric power transmission unit and chargeable electric power of said electric power reception unit, obtaining a sum of said first electric power and said second electric power as electric power suppliable from a power supply, and performing drive control of said first rotating electric machine based on said electric power suppliable from a power supply;

a voltage conversion unit converting a first voltage output from said power storage device; and a rotating electric machine driving unit receiving a voltage converted by said voltage conversion unit to drive said first rotating electric machine, wherein said electric power reception unit is connected to an electric power transfer path connecting between said voltage conversion unit and said rotating electric machine driving unit, and said control device performs voltage conversion control for said voltage conversion unit based on a highest voltage among said first voltage output from said power storage device, a second voltage requested by said rotating electric machine driving unit and a third voltage requested by said electric power reception unit; and an internal combustion engine;

a second rotating electric machine receiving power from said internal combustion engine to generate electric power used in said first rotating electric machine;

a voltage conversion unit converting a first voltage output from said power storage device; and a rotating electric machine driving unit receiving a voltage converted by said voltage conversion unit to drive said first and second rotating electric machines, wherein said rotating electric machine driving unit requests a second voltage determined based on an operation of each of said first and second rotating electric machines, and said electric power reception unit is connected to a neutral point of a stator coil of said second rotating electric machine and a neutral point of a stator coil of said first rotating electric machine, and said control device performs voltage conversion control for said voltage conversion unit based on a highest voltage among said first voltage output from said power storage device and said second voltage requested by said rotating electric machine driving unit, and on a third voltage requested by said electric power reception unit.

2. A method for controlling a vehicle including a power storage device, an electric power reception unit receiving electric power from an electric power transmission unit external to a vehicle, a first rotating electric machine driven by electric power supplied from said power storage device and electric power supplied from said electric power reception unit, a voltage conversion unit converting a first voltage output from said power storage device, a rotating electric machine driving unit receiving a voltage converted by said voltage conversion unit to drive said first rotating electric machine, said electric power reception unit being connected to an electric power transfer path connecting between said voltage conversion unit and said rotating electric machine driving unit, said method comprising the steps of:

calculating first electric power that can be output from said power storage device based on a state of said power storage device;

calculating second electric power that can be charged from outside based on transmittable electric power of said electric power transmission unit and chargeable electric power of said electric power reception unit;

obtaining a sum of said first electric power and said second electric power as electric power suppliable from a power supply;

performing drive control of said first rotating electric machine based on said electric power suppliable from a power supply; and performing voltage conversion control for said voltage conversion unit based on a highest voltage among said first voltage output from said power storage device, a second voltage requested by said rotating electric machine driving unit and a third voltage requested by said electric power reception unit;

wherein said vehicle further includes an internal combustion engine, a second rotating electric machine receiving power from said internal combustion engine to generate electric power used in said first rotating electric machine, a voltage conversion unit converting a first voltage output from said power storage device, and a rotating electric machine driving unit receiving a voltage converted by said voltage conversion unit to drive said first and second rotating electric machines, said rotating electric machine driving unit requests a second voltage determined based on an operation of each of said first and second rotating electric machines, and said electric power reception unit is connected to a neutral point of a stator coil of said second rotating electric machine and a neutral point of a stator coil of said first rotating electric machine, said method further comprising the step of:

performing voltage conversion control for said voltage conversion unit based on a highest voltage among said first voltage output from said power storage device and said second voltage requested by said rotating electric machine driving unit, and on a third voltage requested by said electric power reception unit.

3. A vehicle comprising:

a power storage device;

an electric power reception unit receiving electric power from an electric power transmission unit external to a vehicle;

a first rotating electric machine driven by electric power supplied from said power storage device and electric power supplied from said electric power reception unit; and a control device for performing drive control of said first rotating electric machine, said control device calculating first electric power that can be output from said power storage device based on a state of said power storage device, calculating second electric power that can be charged from outside based on transmittable electric power of said electric power transmission unit and chargeable electric power of said electric power reception unit, obtaining a sum of said first electric power and said second electric power as electric power suppliable from a power supply, and performing drive control of said first rotating electric machine based on said electric power suppliable from a power supply; and a voltage conversion unit converting a first voltage output from said power storage device; and a rotating electric machine driving unit receiving a voltage converted by said voltage conversion unit to drive said first rotating electric machine, wherein said electric power reception unit is connected to an electric power transfer path connecting between said voltage conversion unit and said rotating electric machine driving unit, and said control device performs voltage conversion control for said voltage conversion unit based on a highest voltage among said first voltage output from said power storage device, a second voltage requested by said rotating electric machine driving unit and a third voltage requested by said electric power reception unit.

4. The vehicle according to claim 3, further comprising:
an internal combustion engine; and
a second rotating electric machine receiving power from said internal combustion engine to generate electric power used in said first rotating electric machine, wherein said rotating electric machine driving unit drives said second rotating electric machine in addition to said first rotating electric machine, and requests said second voltage determined based on an operation of each of said first and second rotating electric machines.

5. A method for controlling a vehicle including a power storage device, an electric power reception unit receiving electric power from an electric power transmission unit external to a vehicle, and a first rotating electric machine driven by electric power supplied from said power storage device and electric power supplied from said electric power reception unit, said method comprising the steps of:

calculating first electric power that can be output from said power storage device based on a state of said power storage device;

calculating second electric power that can be charged from outside based on transmittable electric power of said electric power transmission unit and chargeable electric power of said electric power reception unit;

obtaining a sum of said first electric power and said second electric power as electric power suppliable from a power supply; and performing drive control of said first rotating electric machine based on said electric power suppliable from a power supply; wherein said vehicle further includes a voltage conversion unit converting a first voltage output from said power storage device; and a rotating electric machine driving unit receiving a voltage converted by said voltage conversion unit to drive said first rotating electric machine, and said electric power reception unit is connected to an electric power transfer path connecting between said voltage conversion unit and said rotating electric machine driving unit, said method further comprising the step of:

performing voltage conversion control for said voltage conversion unit based on a highest voltage among said first voltage output from said power storage device, a second voltage requested by said rotating electric machine driving unit and a third voltage requested by said electric power reception unit.

6. The method for controlling a vehicle according to claim 5, wherein said vehicle further includes an internal combustion engine and a second rotating electric machine receiving power from said internal combustion engine to generate electric power used in said first rotating electric machine, and said rotating electric machine driving unit drives said second rotating electric machine in addition to said first rotating electric machine, and requests said second voltage determined based on an operation of each of said first and second rotating electric machines.

* * * * *